United States Patent [19]

Trucco

[11] 4,372,264
[45] Feb. 8, 1983

[54] INTERNAL COMBUSTION ENGINE FOR DIVERSE FUELS

[76] Inventor: Horacio A. Trucco, 13 Saddler Ct., Huntington Station, N.Y. 11746

[21] Appl. No.: 107,338

[22] Filed: Dec. 26, 1979

[51] Int. Cl.³ .............................................. F02B 19/10
[52] U.S. Cl. .................................. 123/255; 123/209; 123/292; 123/557; 123/568
[58] Field of Search .............. 123/250, 251, 252, 255, 123/292, 143 A, 143 B, 557, 59 EC, 568, 209, 429

[56] References Cited

U.S. PATENT DOCUMENTS

| | | | |
|---|---|---|---|
| 887,703 | 5/1908 | Sharpneck | 123/292 |
| 892,296 | 6/1908 | Oberhansli | 123/250 |
| 1,152,003 | 8/1915 | Butler | 123/557 |
| 1,520,772 | 12/1924 | Ricardo | 123/143 B |
| 1,753,253 | 4/1930 | Tacchella | 123/275 |
| 2,614,546 | 10/1952 | Schwarz | 123/292 X |
| 3,443,552 | 5/1969 | VonSeggern et al. | 123/275 X |
| 3,765,382 | 10/1973 | Vandenberg | 123/557 |
| 3,809,030 | 5/1974 | Moiroux | 123/254 |
| 3,945,352 | 3/1976 | Reimuller | 123/557 |
| 4,075,980 | 2/1978 | Anger | 123/59 EC X |
| 4,223,645 | 9/1980 | Nohira et al. | 123/292 |

FOREIGN PATENT DOCUMENTS 2575 of 1908 United Kingdom .............. 123/292

*Primary Examiner*—Tony M. Argenbright

[57] ABSTRACT

A fuel vaporizer chamber that is interconnected with a conventional combustion chamber through a valve. The valve allows hot combustion products to enter the chamber during the expansion stroke and is closed to trap the products therein. Fuel is then injected into the chamber and vaporized. The valve is opened to release the vaporized fuel mixture into the combustion chamber during the subsequent compression stroke. The charge is then ignited and the cycle is repeated.

14 Claims, 6 Drawing Figures

INTERNAL COMBUSTION ENGINE FOR DIVERSE FUELS

SUMMARY

The intermittent internal combustion engines, as known today, can be divided into two basic categories; (a) the spark ignited, or gasoline engine and (b) the compression ignition, or Diesel engine. Each type of engine requires a different fuel which properties are very specific; the spark ignited engine calls, among others, for a fuel with relative high volatility and high "octane number" while the Diesel engine requires fuel with relatively low viscosity and high "cetane number". Because this rather narrow and precise required fuel properties the percentage of motor fuel obtainable from crude oil is relatively low. Today engine designers are looking for new ways that will make it possible to utilize lower quality fuels in these engines, because it will increase the yield of useful motor fuel obtainable from petroleum. In addition, if we consider the vast resources of non-petroleum liquid fuels available to use plus the possibility to produce inexpensive synthetic liquid fuels, and coal-liquid slurries that cannot be utilized in present types of internal combustion engines, it is obvious that a new type of engine that could efficiently accept these low grade fuels will immediately find its way in the motor vehicle, and power plant market reducing the nations dependence on imported crude oil while creating the need for domestic produced alternate fuels and utilizing our immense coal resources.

This invention can easily be incorporated into any type of intermittent internal combustion engine as known today and can immediately be utilized in automobile and transportation engines effecting a drastic reduction in the nation petroleum consumption.

SPECIFICATION

It is the object of this invention to provide intermittent internal combustion engines with a mean to vaporize a liquid fuel or slurry fuel prior to its mixing with the combustion air. It is a further object of this invention to append a vaporizer chamber interconnected to the conventional combustion chamber of said engine through a valve that can be opened and closed as required. It is a further object of this invention to provide said vaporizer and combustion chambers with a multiplicity of fuel injectors and spark plugs such as to obtain a controllable and dependable combustion with most liquid fuels and slurry fuels regardless of its octane or cetane rating, its volatility, its viscosity and similiar properties required by the spark ignited and/or Diesel engine. It is still a further object of this invention to achieve combustion inside said engines resulting in low and acceptable emission indexes for carbon monoxide (CO), oxides of nitrogen ($NO_x$), unburned hydrocarbons (UHC) particularte matter and soot.

Other objects, advantates and features will futher become apparent hereinafter in the drawings in which.

Figure 1:
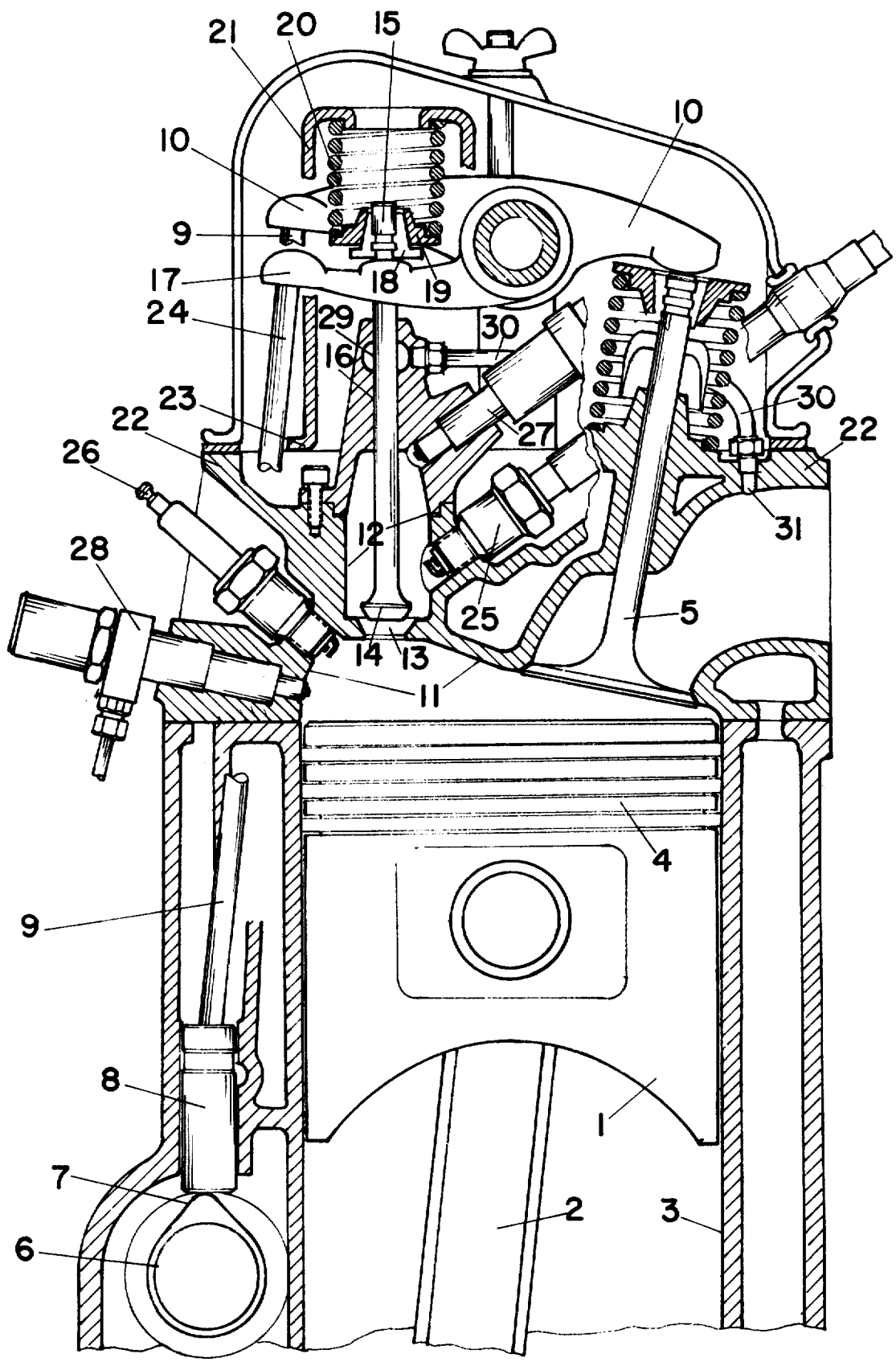
FIG. 1 is a cross-sectional view of a four-stroke internal combustion engine constructed in accordance with this invention.

In describing the embodiments of this invention illustrated in the drawings specific terminology will be used for the sake of clarity. However, it is not intended to be limited to the specific terms so selected and is to be understood that each specific term includes all technical equivalents which operate in a similar manner to accomplish a similar purpose.

In the preferred embodiment of this invention illustrated in FIG. 1, an internal combustion engine, partially shown, is seen to consist of a piston 1, shown near its top dead center (TDC), connecting rod 2, cylinder 3, piston rings 4, intake valve 5, exhaust valve not shown, camshaft 6, a multiplicity of cams 7, a multiplicity of valve tappets 8, acting on push rods 9 that cause rocker arms 10 to actuate said intake and exhaust valves in accordance to a four-stroke cycle, a conventional combustion chamber 11, a vaporizer chamber 12 interconnected to said conventional combustion chamber through a passage 13, a vaporizer valve 14, shown in the open position, valve stems 15, valve guide 16, vaporizer rocker arm 17, mechanically contacting valve locks 18, spring retainer 19, valve spring 20, spring bracket 21, attached to cylinder head 22 through a multiplicity of points 23, a push rod 24, actuated by said camshaft and said valve tappet such as to open or close said vaporizer valve by the combined action of rocker arm 17 and valve spring 20, a spark (or glow) plug 25 reaching said vaporizer chamber, a spark (or glow) plug 26 reaching said conventional combustion chamber, a fuel injector 27 penetrating into said vaporizer chamber, a secondary fuel injector 28 penetrating into said conventional combustion chamber, a leak collecting plenum 29, a passage 30 connecting said plenum to intake duct through orifice 31.

In operation, a fresh charge of air (or gaseous oxidizer) containing no fuel is drawn, without throttling, into cylinder 3 during the downstroke of piston 1 while intake valve is open but exhaust valve and vaporizer valve 14 are closed, during the following upstroke of piston 1 the charge of air is compressed, all valves are closed, thus increasing its temperature and pressure. Before piston 1 reaches its TDC vaporizer valve 14 opens. Assume the vaporizer chamber 12 is filled with vaporized fuel which temperature and pressure is "higher" than the levels for the compressed charge of air, when vaporizer valve 14 opens the fuel vapors will transfer from vaporizer chamber 12 into conventional combustion chamber 11 mixing with the compressed air in all gaseous phase, at this point spark plug 26 delivers a spark that ignites the vaporized fuel-compressed air mixture establishing a diffusion flame. It is important to realize that because the fuel is vaporized and it is at a temperature sufficiently high for autoignition there is not ignition delay involved in the initiation of the chemical reaction, and in addition because the gaseous state of the fuel the flame front is only controlled by its mixing rate. The important advantage of this new type of internal combustion engine is that any type of liquid fuel or slurry fuel, regardless of its cetane index will instantly ignite and thereafter sustain a vigorous, but smooth, combustion characterized by a noise-free operation of the eninge. An added advantage is that a diffusion flame from gaseous mixtures cannot detonate thus eliminating the need for octane rated fuel. The combustion phase continues while piston 1 reaches its TDC and during a part of the following downstroke that delivers mechanical power to the engine crankshaft. At a selected point during this expansion phase of the cycle the vaporizer valve 14 closes entrapping inside vaporizer chamber 12 hot combustion products gases. After vaporizer valve 14 closes piston 1 continues the expansion phase of the cycle, followed by the opening of the exhaust valve and the exhausting of combustion products during the next upstroke of piston 1 completing a four-stroke cycle. Notice that after vaporizer valve 14 closes the entrapped combustion products cannot expand so they maintain its relative high level of pressure and temperature. At a desired point after vaporizer valve 14 was closed fuel injector 27 sprays liquid fuel or slurry fuel into vaporizer chamber 12. The fuel spray absorbs heat by direct mixing with the entrapped combustion products vaporizing at a finite rate. Now the vaporizer chamber contains a mixture of combustion products and vaporized fuel. Notice that the entrapped combustion products contain insignificant amounts of oxygen (or oxidizer), consequently the injected fuel cannot burn inside vaporizer chamber 12. The vaporized fuel is now ready to be transferred into conventional combustion chamber 11 at the opportune time to repeat the cycle described above. Small amounts of vaporized fuel that will leak through valve stem 15 are collected in chamber 29 from where it is recirculated back into the cylinder via passage 30 and orifice 31 during an intake phase of a cycle.

Figure 2:
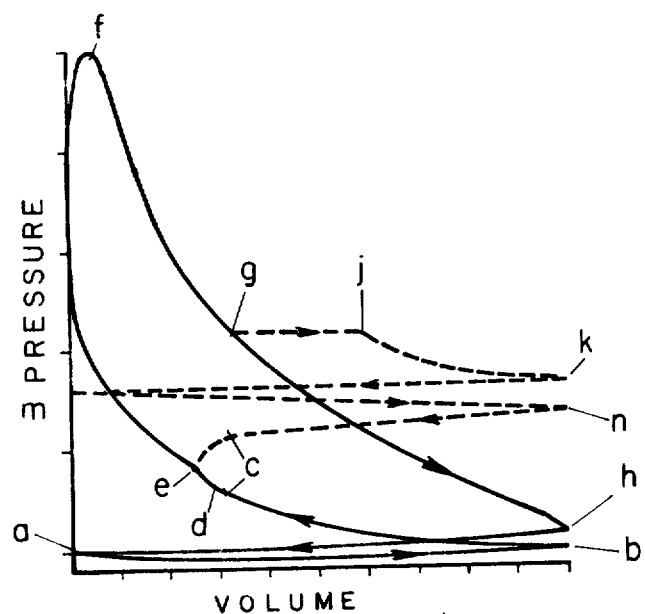
FIGS. 2, 3 and 4 show pressure volume diagrams corresponding to engines constructed in accordance with this invention.

FIG. 2 is a pressure-volume diagram of the cycle described above, solid lines represent the pressure variation inside combustion chamber 11 and dashed lines represent the pressure variation inside vaporizer chamber 12. Arrows indicate the event direction as cycle progress. From point "a" to point "b" the unthrottled induction of a fresh charge of air takes place, from point "b" to point "c" the air is compressed while all valves are closed, at point "c" vaporizer valve 14 opens allowing to vent the contents of vaporizer chamber 12 into conventional combustion chamber 11 through orifice 13. Immediately after, at point "d" a spark supplied by spark plug 26 ignites the mixture of vaporized fuel and compressed air. The pressure inside combustion chamber 11 rapidly increases due to the combustion and the moving of piston 1 travelling toward its TDC. The pressure inside vaporizer chamber 12 initially decreases due to the venting, at point "e" it is approximately equal to the pressure level inside combustion chamber 11. Because the volume of combustion chamber 11 continues to decrease, but the volume of vaporizer chamber 12 is fixed, the flame front established inside combustion chamber 11 will move back into vaporized chamber with a reverse (or inverted) diffusion flame. After piston 1 reaches its TDC, the common pressure inside combustion and vaporizer chambers peaks at point "f". During the expansion phase from point "f" to point "h" the vaporizer valve 14 closes at a intermediate point "g" entrapping hot combustion products inside vaporized chamber 12. Notice that, while the engine cycle evolves from point "e" through point "g", vaporizer chamber 12 and conventional combustion chamber 11 both in combination determine the boundary of the "actual" combustion chamber. The bulk of the combustion products continues the cycle dictated by the displacement of piston 1, from point "h" to point "a" the exhaust phase completes the fourth stroke of the cycle. Going back to point "g" notice that the relatively high pressure and temperature prevailing inside vaporizer chamber remains approximately constant until when at point "j" liquid fuel or slurry fuel is injected inside the vaporizer chamber 12, the liquid fuel droplets and particles absorb heat by direct mixing with the entrapped hot combustion products. As a result vaporizer chamber walls. As a result the injected fuel vaporizes and superheats. Notice that the residence time available for vaporization includes the cycle evolution time point "j" through points "k", "m", "n" and finally point "c" when vaporizer valve 14 opens. Point "j" was selected to emphasize the relative long residence time available for the injected fuel to vaporize. Depending on the particular fuel utilized, point "j" can be shifted to a later time before point "c" is reached. Notice that the combustion process described above occurs in the presence of some inert combustion product from the previous cycle, its chemistry is similar to the one in exhaust gas recirculation technique widely used for $NO_x$ reduction of internal combustion engines. Furthermore a fully vaporized fuel, below stoichiometric fuel-air ratio combust with minimum emission of UHC, CO, soot and smoke.

Figure 3:
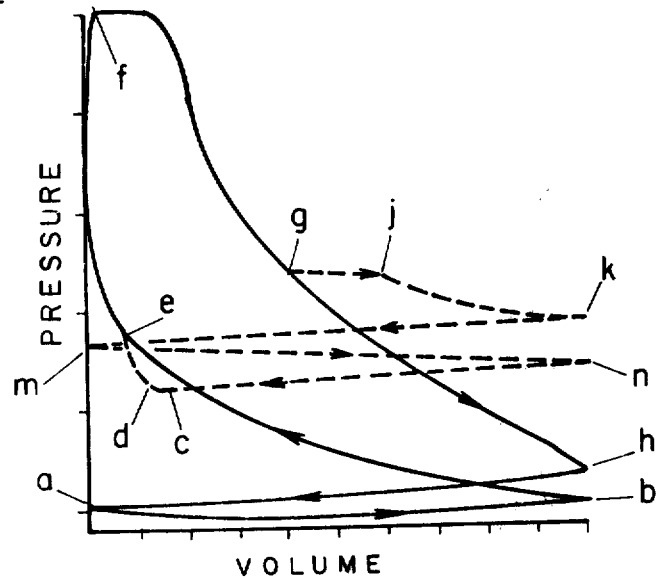

FIG. 3 is a pressure-volume diagram obtainable with the present invention that differs from the one shown in FIG. 2 as described below. At point "c" when vaporizer valve 14 opens the pressure prevailing inside vaporizer chamber 12 is "lower" than the pressure inside conventional combustion chamber 11, consequently fresh compressed air (or oxidizer) is transferred into vaporizer chamber 12, at point "d" spark plug 25 supplies a spark that ignites the air-vaporized fuel mixture establishing a reverse diffusion flame. Notice that spark plug 25 does not contribute to the vaporization process that takes place while cycle evolves from point "j" through point "c". At point "f" when most of the vaporized fuel had been consumed a secondary amount of liquid fuel or slurry fuel is sprayed by secondary fuel injector 28, inside combustion chamber 11 where a fraction of the initial fresh charge of air is still available, since its temperature at this point is much higher than the one normally obtainable in a Diesel engine the additional secondary fuel injected will easily ignite and burn with a diffusion flame much like in a Diesel engine regardless of its cetane rating.

The flexibility of secondary fuel injection utilizing secondary fuel injector 28 also applies to the case of the cycle described by FIG. 2. The effect of secondary fuel injection is better shown in FIG. 4 where the dashed line indicates the effect of such secondary fuel injection.

Power is controlled, like in a Diesel engine, by metering the total amount of fuel injected to each cycle since the aspirated amount of fresh air is nonthrottled.

Cold starting this engine can be achieved in various manners depending upon the properties of the fuel utilized. Fuel with light viscosity and high volativity can be initially injected into the vaporizer chamber 12 to obtain ignition with assistance of a spark, after engine has warmed up, usually a few seconds, a much heavier fuel can be utilized for injection into vaporizer chamber 12 and thus achieve the vaporization described above. A second alternative is to externally preheat the walls of the vaporizer chamber 12, with this technique the engine will cold start utilizing heavier fuels. A third alternative is to temporarily mix fuel with the intaking air alike in a spark ignited engine and to run the engine in this mode, until it warms up and then initiates the fuel injection into vaporizer chamber 12.

Figure 5:
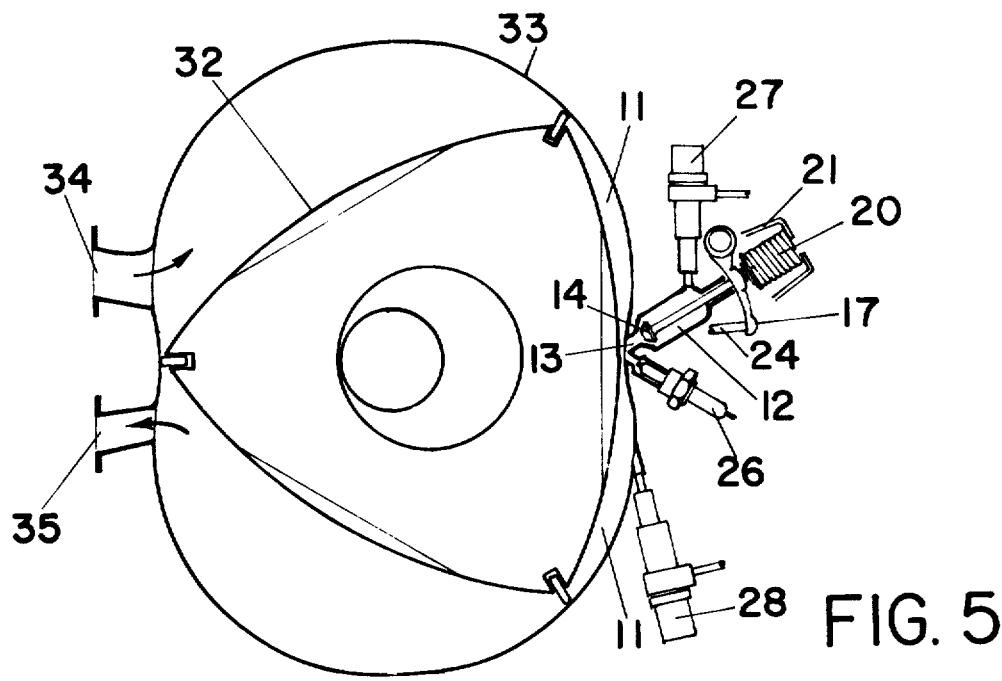
FIG. 5 is a cross-sectional view of a rotary piston internal combustion engine constructed in accordance with this invention.

FIG. 5 is an embodiment showing a cross-sectional view of a rotary piston engine constructed in accordance with this invention, seen to consist of a rotor 32, a casing 33, an intake port 34, an exhaust port 35, a conventional combustion comber 11, vaporizer chamber 12 interconnected to said conventional combustion chamber through a passage 13, a vaporizer valve 14, vaporizer rocker arm 17, valve spring 20, spring bracket 21 attached to said engine casing (not shown), a push rod 24, actuated by a cam and tappet mechanism (not shown), a spark plug 26 reaching said conventional combustion chamber, a fuel injector 27 penetrating into said vaporizer chamber, a secondary fuel injector 28 penetrating into said combustion chamber.

Figure 4:
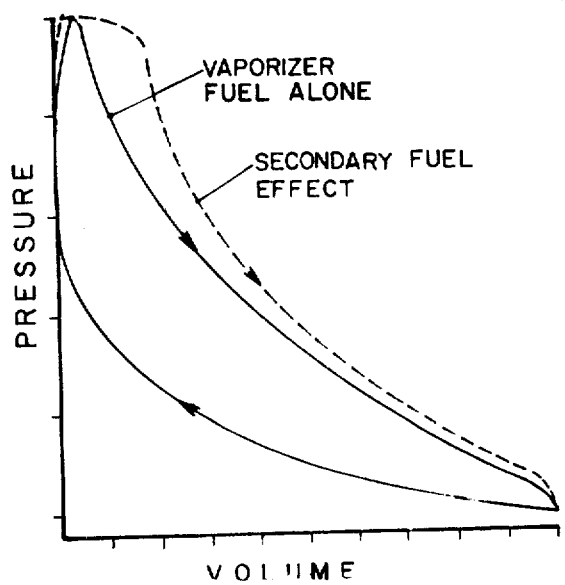

In operation, a fresh charge of air is drawn through intake port 34 and a four-stroke cycle as described in FIG. 2 or 4 takes place exhausting its combustion products through port 35.

Figure 6:
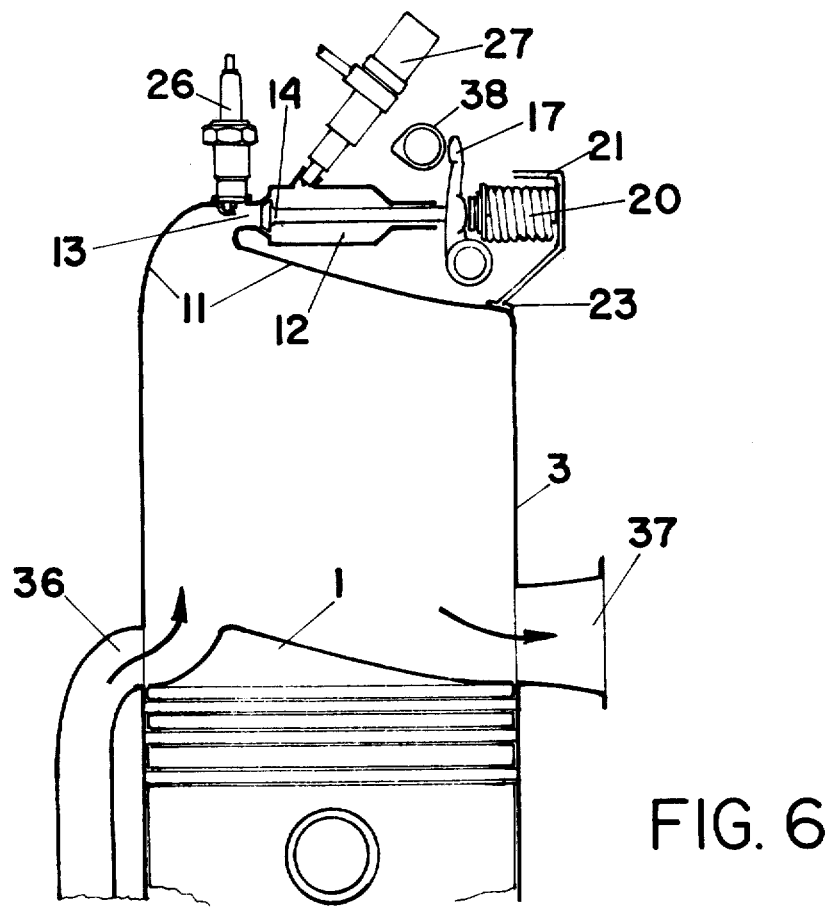
FIG. 6 is a cross-sectional view of a two-stroke internal combustion engine constructed in accordance with this invention.

FIG. 6 is an embodiment showing in cross-sectional view a two-stroke piston engine constructed in accordance to this invention, seen to consist of a piston 1, cylinder 3, provided with intake transfer port 36 and exhaust port 37, a conventional combustion chamber 11, a vaporizer chamber 12 interconnected to said conventional combustion chamber through passage 13, a vaporizer valve 14, vaporizer rocker arm 17, valve spring 20, spring bracket 21 attached to cylinder head at a multiplicity of points 23, a cam 38 acting on said vaporizer rocker arm, a spark plug 26 reaching said conventional combustion chamber, a fuel injector 27 penetrating into said vaporizer chamber.

In operation, a fresh charge of air is drawn through intake transfer port 36, while exhausting the combustion products from previous cycle through port 37. It is easier to realize that a pressure-volume diagram similar to the one shown in FIG. 2 applies to this two-stroke engine. Notice that in both cases of FIG. 5 and FIG. 6 only one spark plug is necessary to obtain controllable combustion, and that said spark plug 26 is placed "outside" vaporizer chamber 12. The embodiment of FIG. 1, because it has two spark plugs, can operate either pressure-volume diagram as shown in FIG. 2 or FIG. 3.

It will be obvious to those skilled in this art that the invention described above is applicable to any type of intermittent internal combustion engine, and that, any valving mechanism that will perform the above described function vaporizer valve 14 can be utilized in conjunction with any mechanism or combination of mechanisms that will control the opening and closing of said vaporizer valve without modifying the intent of this invention.

Various changes and variations may be made without departing from the spirit of this invention and the scope thereof as defined in the following claims.

What I claim is:

1. A device that operates in conjunction with an internal combustion engine to produce intermittent vaporization of discrete amounts of fuel that are subsequently utilized in the operation of an internal combustion engine comprising in combination, a fuel vaporizer chamber, a vaporizer valve, means to cyclically open said vaporizer valve to replenish said fuel vaporizer chamber with hot gaseous products of combustion generated by an internal combustion engine, means to cyclically introduce into said fuel vaporizer chamber metered amounts of fuel that vaporize by absorbing heat from said replenished hot gaseous products of combustion; means to close said vaporizer valve such as to temporarily entrap inside said vaporizer chamber said replenished hot gaseous products of combustion and said metered amount of fuel, means to cyclically open said vaporizer valve to discharge the resulting mixture of said vaporized fuels and said replenished hot gaseous products of combustion supplying an internal combustion engine in a mode to form a combustible mixture.

2. A device that operates in conjunction with an internal combustion engine to produce cyclic vaporization of discrete amounts of fuel that are subsequently utilized in the operation of said internal combustion engine comprising in combination, a fuel vaporizer chamber, a vaporizer valve, means to cyclically open said vaporizer valve to replenish said fuel vaporizer chamber with hot gaseous products of combustion generated by said internal combustion engine, means to cyclically introduce into said fuel vaporizer chamber metered amounts of fuel that vaporizes by absorbing heat from said replenished hot gaseous products of combustion, means to close said vaporizer valve such as to temporarily entrap inside said fuel vaporizer chamber said replenished hot gaseous products of combustion and said metered amounts of fuel, means to cyclically open said vaporizer valve to discharge from said fuel vaporizer chamber the resulting mixture of said vaporized fuel and said replenished hot gaseous products of combustion supplying said internal combustion engine in a manner that forms a combustible mixture.

3. An intermittent internal combustion engine having a combustion chamber and means for supplying a fresh charge of air thereto, the improvements comprising, a fuel vaporizer chamber communicating with said combustion chamber, a vaporizer valve, between said fuel vaporizer chamber and said combustion chamber, means to cyclically open said vaporizer valve during the compression stroke to vent its content into said combustion chamber to form a combustible mixture, means to cyclically close said vaporizer valve during the expansion stroke of the engine to entrap hot product of combustion within said fuel vaporizer chamber, a fuel injector discharging into said fuel vaporizer chamber, means to cyclically supply said fuel injector with a metered amount of liquid or slurry fuel while combustion products are entrapped whereby the fuel is vaporized inside said fuel vaporizer chamber because it absorbs heat by direct mixing with the entrapped hot products of combustion.

4. The combination of claim 3 and including, a spark plug mounted in said combustion chamber, means to fire said spark plug.

5. The combination of claim 3 and including, a secondary fuel injector discharging into said combustion chamber, means to cyclically supply said secondary fuel injector with a metered amount of liquid or slurry fuel.

6. The combination of claim 3 and including, means to supply said fuel injector with various different type of fuels.

7. The combination of claim 3 and including, means to preheat said vaporizer chamber.

8. The combination of claim 3 and including, means to supply fuel to the intaking fresh charge of air such as to form a combustible mixture inside said combustion chamber.

9. An intermittent internal combustion engine having a combustion chamber and means for supplying a fresh charge of air thereto, the improvements comprising, a fuel vaporizer chamber communicating with said combustion chamber, a vaporizer valve between said fuel vaporizer chamber and said combustion chamber, means to cyclically open said vaporizer valve during the compression stroke to discharge the air compressed inside said combustion chamber into said fuel vaporizer chamber to form a combustible mixture, means to cyclically close said vaporizer valve during the expansion stroke of the engine to entrap hot product of combustion within said fuel vaporizer chamber, a fuel injector discharging into said fuel vaporizer chamber, means to cyclically supply said fuel injector with a metered amount of liquid or slurry fuel while combustion products are entrapped whereby the fuel is vaporized inside said fuel vaporizer chamber because it absorbs heat by direct mixing with the entrapped products of combustion.

10. The combination of claim 9 and including, a spark plug mounted in said fuel vaporizer chamber, means to fire said spark plug after said vaporizer valve is opened.

11. The combination of claim 9 and including, a secondary fuel injector discharging into said combustion chamber, means to cyclically supply said secondary fuel injector with a metered amount of liquid or slurry fuel.

12. The combination of claim 9 and including, means to supply said fuel injector with various different type of fuels.

13. The combination of claim 9 and including, means to preheat said vaporizer chamber.

14. The combination of claim 9 and including, means to supply fuel to the intaking fresh charge of air such as to form a combustible mixture inside said combustion chamber.

* * * * *